US010073115B1

(12) United States Patent
Tokars et al.

(10) Patent No.: US 10,073,115 B1
(45) Date of Patent: Sep. 11, 2018

(54) SELF DIAGNOSTIC ACCELEROMETER FIELD PROGRAMMABLE GATE ARRAY (SDA FPGA)

(71) Applicant: The United States of America, as represented by the Administrator of the National Aeronautics and Space Administration, Washington, DC (US)

(72) Inventors: Roger P. Tokars, LaGrange, OH (US); John D. Lekki, Elyria, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 146 days.

(21) Appl. No.: 15/131,089

(22) Filed: Apr. 18, 2016

(51) Int. Cl.
*G01P 15/09* (2006.01)
*G01P 21/00* (2006.01)

(52) U.S. Cl.
CPC .............. *G01P 21/00* (2013.01); *G01P 15/09* (2013.01)

(58) Field of Classification Search
CPC .. G01C 19/721; G01C 19/5776; G01C 21/10; G01C 19/04; G01C 19/5726; G01P 15/125; G01P 21/00; G01P 15/00; G01P 15/097; G01P 15/09
See application file for complete search history.

(56) References Cited

U.S. PATENT DOCUMENTS

| | | | |
|---|---|---|---|
| 4,870,302 A * | 9/1989 | Freeman | H03K 19/1736 326/40 |
| 5,251,469 A | 10/1993 | Chan | |
| 5,457,982 A | 10/1995 | Spies et al. | |
| 5,753,793 A | 5/1998 | Lindahl et al. | |
| 5,895,858 A | 4/1999 | Malone et al. | |
| 5,927,143 A | 7/1999 | Cho et al. | |
| 7,042,228 B2 | 5/2006 | Lally et al. | |
| 7,086,270 B2 | 8/2006 | Weinbert et al. | |
| 7,093,478 B2 | 8/2006 | Chau et al. | |
| 7,539,569 B2 | 5/2009 | Baur et al. | |
| 7,554,343 B2 | 6/2009 | Bromfield | |
| 7,936,175 B2 | 5/2011 | Kirkelund et al. | |

(Continued)

OTHER PUBLICATIONS

Tokars, Jr., Roger P., Lekki, John D.; title "Self Diagnostic Accelerometer testing on the C-17 aircraft"; IEEE Aerospace Conference, Big Sky, Montana; Mar. 2-9, 2013.
(Continued)

*Primary Examiner* — David A Rogers
(74) *Attorney, Agent, or Firm* — Robert H. Earp, III; William M. Johnson

(57) ABSTRACT

A self-diagnostic accelerometer (SDA) field programmable gate array (FPGA) may be capable of real time or near-real time diagnostic processing to determine potential accelerometer issues during flight or other mission critical operational situations. The SDA FPGA may determine accelerometer structural health and an attachment condition using an electronics system that is smaller, more energy efficient, and more cost effective than previous diagnostic tools. Advantages of the system may include diagnosing sensors automatically, immediately, actively (i.e., confirming the fault), and consistently, without the influence of a human operator. Customizable SDA algorithms may be adjusted to the specific needs of the sensor/environment.

15 Claims, 11 Drawing Sheets

(56) References Cited

U.S. PATENT DOCUMENTS

| | | | |
|---|---|---|---|
| 8,056,389 B2 | 11/2011 | Samuels | |
| 8,401,820 B2 | 3/2013 | Jensen et al. | |
| 8,682,509 B2 | 3/2014 | Goodrich et al. | |
| 2008/0257041 A1* | 10/2008 | Datskos | B82Y 15/00 |
| | | | 73/504.02 |
| 2012/0046900 A1 | 2/2012 | Baert | |
| 2016/0048129 A1* | 2/2016 | Kolanek | F41H 11/02 |
| | | | 701/2 |
| 2016/0051164 A1* | 2/2016 | Derichs | A61B 5/05 |
| | | | 600/409 |
| 2016/0298965 A1* | 10/2016 | Kapusta | G01C 19/5719 |
| 2016/0375976 A1* | 12/2016 | Stigler | B64B 1/10 |
| | | | 244/30 |
| 2017/0059527 A1* | 3/2017 | Lopez | G01N 27/9006 |
| 2017/0124925 A1* | 5/2017 | Chykeyuk | B62J 6/20 |
| 2017/0205519 A1* | 7/2017 | Robert | G01V 1/164 |

OTHER PUBLICATIONS

Tokars, Jr., Roger P., Lekki, John D.; title Self Diagnostic Accelerometer Ground Testing on a C-17 Aircraft Engine; IEEE Aerospace Conference, Big Sky, Montana; Mar. 2-9, 2013.

* cited by examiner

SELF DIAGNOSTIC ACCELEROMETER FIELD PROGRAMMABLE GATE ARRAY (SDA FPGA)

ORIGIN OF THE INVENTION

The invention described herein was made by employees of the United States Government and may be manufactured and used by or for the Government for Government purposes without the payment of any royalties thereon or therefore.

FIELD

The present invention generally pertains to accelerometers, and more specifically, to a field programmable gate array (FPGA) based self-diagnostic accelerometer (SDA) system that is used for testing accelerometers.

BACKGROUND

In order to rely upon an accelerometer in an electromechanical system, the health of the accelerometer should be ensured. In certain electromechanical systems, such as aircraft and spacecraft, accurate accelerometer operation may be critical. For instance, sensor system malfunction is a significant contributor to propulsion in-flight shutdowns (IFSDs), which can lead to aircraft and spacecraft accidents, particularly when the issue is compounded with an inappropriate crew response.

Previous techniques for monitoring accelerometer health include simply observing the operation of the sensor. Anomalies and inconsistencies in the sensor values suggest sensor failure. Physically inspecting the sensor could confirm a fault. Voting methods utilizing multiple sensors measuring the same parameter could potentially mitigate the effect of a small number of faulty sensors. However, multiple sensor failures could be catastrophic in a voting scenario.

Physically observing the sensor is often not possible during operation of the electromechanical system, and in-flight testing limits sensor access. Inspection and repair of faulty integrated sensor systems could be difficult and costly in terms of both time and money. Slow diagnosis is also an issue. Automatically and immediately addressing a faulty sensor by removing it from voting or use by other systems is of a high priority in critical situations.

Previously designed, relatively large self-diagnostic accelerometers (SDAs) used a large signal analyzer, which required increased space and power requirements. These SDAs also required attached computers to post-processes the diagnostic data in order to determine the health of the sensor. Thus, the health determination wasn't performed in real time or near-real time. Accordingly, an improved SDA system may be beneficial.

SUMMARY

Certain embodiments of the present invention may be implemented and provide solutions to the problems and needs in the art that have not yet been fully solved by conventional SDA technologies. For example, some embodiments of the present invention pertain to an SDA system that utilizes a field programmable gate array (FPGA) that is capable of real time or near-real time diagnostic processing to determine potential accelerometer issues during flight or other mission critical operational situations. The SDA FPGA in some embodiments may determine accelerometer structural health and an attachment condition using an electronics system that is smaller, more energy efficient, and more cost effective than previous diagnostic tools. Such real time or near-real time diagnostic FPGA systems are neither present in nor available for current aircraft and spacecraft.

In one embodiment, a system includes a FPGA storing, and configured to execute, one or more cross correlation algorithms that diagnose accelerometer health, an attachment condition, or both. The system also includes SDA circuitry operably coupled to the FPGA. The FPGA is configured to provide a diagnostic signal to the SDA circuitry. The SDA circuitry is configured to provide the diagnostic signal to an accelerometer, receive an accelerometer response signal responsive to the diagnostic signal from the accelerometer, and output a modified accelerometer response signal. The FPGA is configured to receive the modified accelerometer response signal from the SDA circuitry, process the modified accelerometer response signal using the one or more cross correlation algorithms, and output an indication of accelerometer health, an attachment condition, or both.

In another embodiment, an SDA FPGA system includes a FPGA storing, and configured to execute, one or more cross correlation algorithms that diagnose accelerometer health, attachment condition, or both. The system also includes a plurality of accelerometers and SDA circuitry operably coupled to the FPGA and the plurality of accelerometers. The FPGA is configured to provide one or more diagnostic signals to the SDA circuitry. The SDA circuitry is configured to provide the one or more diagnostic signals to the plurality of accelerometers, receive accelerometer response signals responsive to the diagnostic signal from each of the plurality of accelerometers, and output modified accelerometer response signals. The FPGA is configured to receive the modified accelerometer response signals from the SDA circuitry, process the modified accelerometer response signals using the one or more cross correlation algorithms, and output indications of health, an attachment condition, or both, for each of the plurality of accelerometers.

In yet another embodiment, a FPGA includes a high frequency diagnostic source configured to generate a diagnostic signal that is sent to SDA circuitry and data acquisition circuitry configured to receive a modified accelerometer response signal from the SDA circuitry responsive to the diagnostic signal. The FPGA also includes memory storing one or more cross correlation algorithms that diagnose accelerometer health, an attachment condition, or both, and at least one processor configured to execute the one or more cross correlation algorithms. The at least one processor is configured to process the response signal from the data acquisition circuitry using the one or more cross correlation algorithms and output an indication of accelerometer health, an attachment condition, or both.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to an SDA FPGA that is capable of real time or near-real time diagnostic processing to determine potential accelerometer issues during flight or other mission critical operational situations. The SDA FPGA in some embodiments may determine accelerometer structural health and an attachment condition using an electronics system that is smaller, more energy efficient, and more cost effective than previous diagnostic tools. Advantages of the system of some embodiments include diagnosing sensors automatically, immediately, actively (i.e., confirming the fault), and consistently, without the influence of a human operator. Customizable SDA algorithms may be adjusted to the specific needs of the sensor/environment. The SDA FPGA system of some embodiments provides a smaller, more power efficient, more cost effective, and more user-customizable diagnostic system than conventional systems. Each sensor's reference signal responses for the fault conditions of interest should be determined in order to positively correlate specific faults.

The development of the SDA in some embodiments is important to reducing the IFSD rate, and hence reducing the rate at which this component failure type can put aircraft and spacecraft in jeopardy, as well as providing a critical enabling technology for future automated malfunction diagnostic systems. Critical sensors, such as engine sensors, are inaccessible to the operator during typical operation due to safety concerns, as well as enclosed operating environments. The SDA FPGA of some embodiments can diagnose the sensor in-flight and remotely with minimal interference with the typical operation of the sensor. The SDA FPGA system may utilize programmed health algorithms that can automatically determine sensor health, therefore increasing the precision in diagnosing sensor faults by removing the erroneous perspective and opinions of a human operator. The health of the sensor could also be determined immediately, which would remove its erroneous effect on a system that depends on the sensor.

Figure 1:
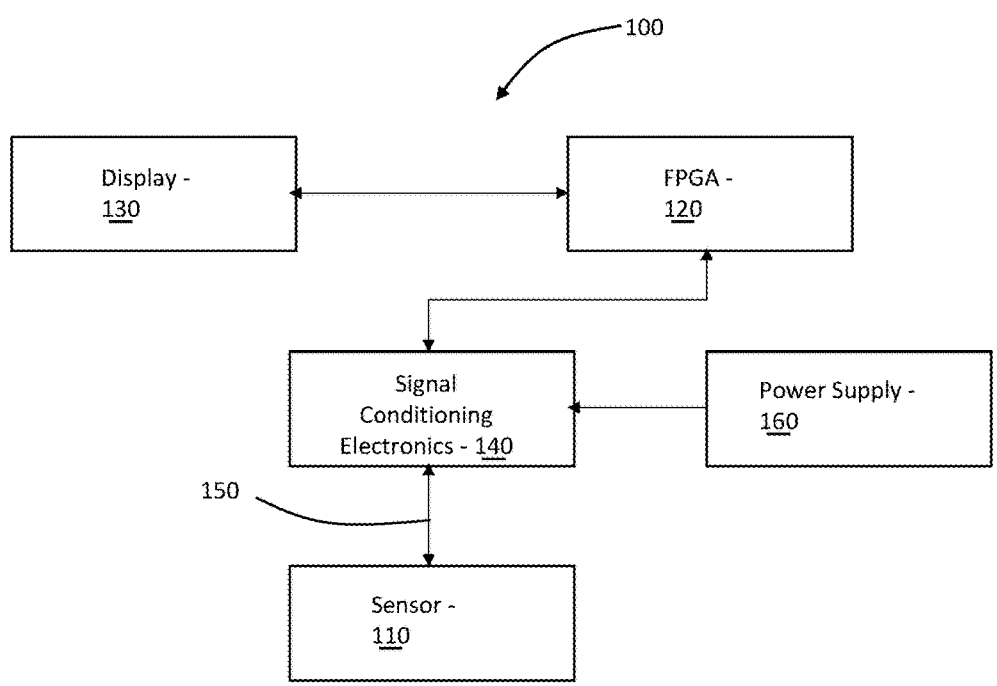
FIG. 1 is a schematic diagram of a SDA FPGA system, according to an embodiment of the present invention.

FIG. 1 is a schematic diagram of a SDA FPGA system 100, according to an embodiment of the present invention. SDA FPGA system 100 includes a sensor 110, an FPGA 120, a display 130, signal conditioning electronics 140, connecting cables 150, and a power supply 160. Sensor 110 in this embodiment is a piezoelectric charge accelerometer. FPGA 120 is an Altera Stratix III™ development kit with a Terasic™ input/output daughter card. Signal conditioning electronics 140 is a NASA-designed circuit including filters and amplifiers to improve the output and input signals to and from FPGA 120. Connecting cables 150 were accelerometer-grade cables in this embodiment. 12V power supply 160 powered signal conditioning electronics 140 (also referred to herein as "SDA circuitry") and a separate power supply (not shown) powered FPGA 120.

Figure 2:
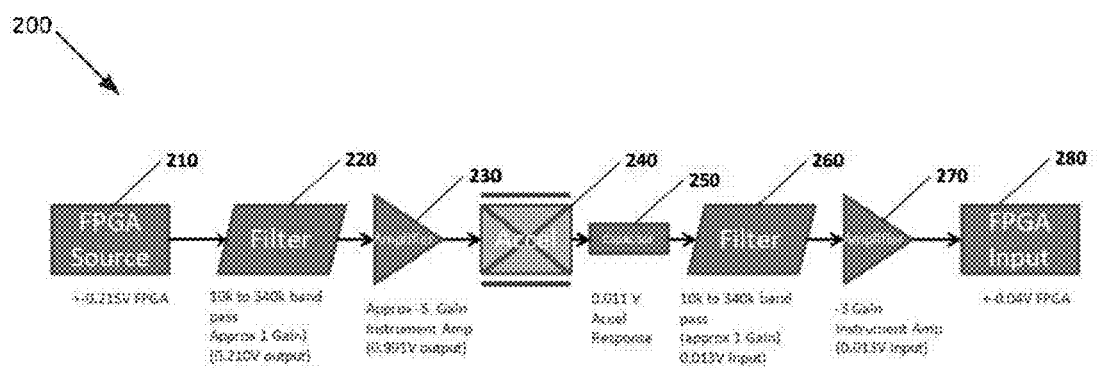
FIG. 2 is an architectural diagram illustrating a SDA system, according to an embodiment of the present invention.

FIG. 2 is an architectural diagram illustrating a SDA system 200, according to an embodiment of the present invention. An FPGA (not shown) generates a sinusoidal wave that sweeps from 30 kHz to 80 kHz, for example. The FPGA outputs a +0.215V diagnostic signal as source signal 210, which then passes through a 10 k to 340 k band pass filter 220 that reduces noise in source signal 210. The cleaned up diagnostic signal at approximately 1 Gain and 0.210V is then amplified by an approximately 5 Gain instrument amplifier 230. The diagnostic signal is then output at 0.991V to accelerometer 240.

A 0.011V response from accelerometer 240 is then coupled into a capacitor 250. The coupled response is filtered by 10 k to 340 k band pass filter 260. The output signal at approximately 1 Gain and 0.013V is amplified by a −3 Gain instrument amplifier 270. The 0.013V output thereof is then read as a 0.04V input signal response 280 to the FPGA.

Input signal response 280 includes a signal pattern with resonant frequencies within the 30 kHz to 80 kHz range, depending on the health and attachment of accelerometer 240. Input signal responses 280 for nominal sensor operation and sensor faults are recorded as references. These references are then cross correlated with the existing signal response in order to diagnose the health and attachment condition of accelerometer 240 in real time. For further information on cross correlation algorithms that may be used in some embodiments, see Roger P. Tokars and John D. Lekki, "Self Diagnostic Accelerometer Ground Testing on a C-17 Aircraft Engine," IEEE Aerospace Conference, Big Sky, Mont. (Mar. 2-9, 2013).

The theory behind the SDA in some embodiments includes piezoelectric theory in which a voltage differential, such as the diagnostic signal, will interact with the piezoelectric crystal. The piezoelectric crystal likewise generates a voltage when the crystal is stressed. The theory of electrical impedance may be used to describe the SDA system's impedance made up of the piezoelectric crystal, cables, electrical components, and mass attachment. The mass attachment is typically a round metal cylinder that has the standard threading for accelerometer attachment. The mass of the cylinder may be made large enough so that the boundary conditions of the sensor are similar to what they would be when the accelerometer is attached to a larger machine.

The total impedance will typically change when any of the SDA system parts change. An electrical signal sent through the SDA system will typically respond differently, depending on the system's total impedance. These different electrical responses can be correlated to faults in accelerometer 240 itself. Electrical filter theory may be used to explain how 30-80 kHz band pass filters improve the signal by removing noise from outside the diagnostic frequency range. Other circuit theory includes signal amplification seen in adjusting the diagnostic signal to get a signal response that is of high enough amplification to be read by the FPGA. Resistor/voltage interaction and capacitor decoupling is important when electrically isolating and reducing noise/interference from the inputs and sources in the SDA circuit.

In other words, cross correlation algorithms of the FPGA determine the correlation between a reference healthy SDA frequency response and the measured SDA frequency response in some embodiments. A high correlation suggests that the condition is healthy, while a low correlation suggests otherwise. In some embodiments, Fast Fourier Transforms (FFTs) of frequency domain signal response may be compared to a reference, and damage to the accelerometer and mounting condition can be determined therefrom. When low correlation is found, a reference fault condition can be cross correlated with the experimental condition to confirm the type of fault condition.

In some embodiments, a relatively low voltage diagnostic signal at less than 1V is generated in order to not damage a piezoelectric accelerometer crystal, for example. Diagnostic signal/source signal 210 is in the frequency range 30 kHz to 80 kHz in this embodiment. Capacitor value of capacitor 250 couples the circuit with accelerometer 240 to improve the signal response. Peripheral equipment in some embodiments may include the vibration data acquisition system and voltage/signal sensing equipment.

Figure 3:
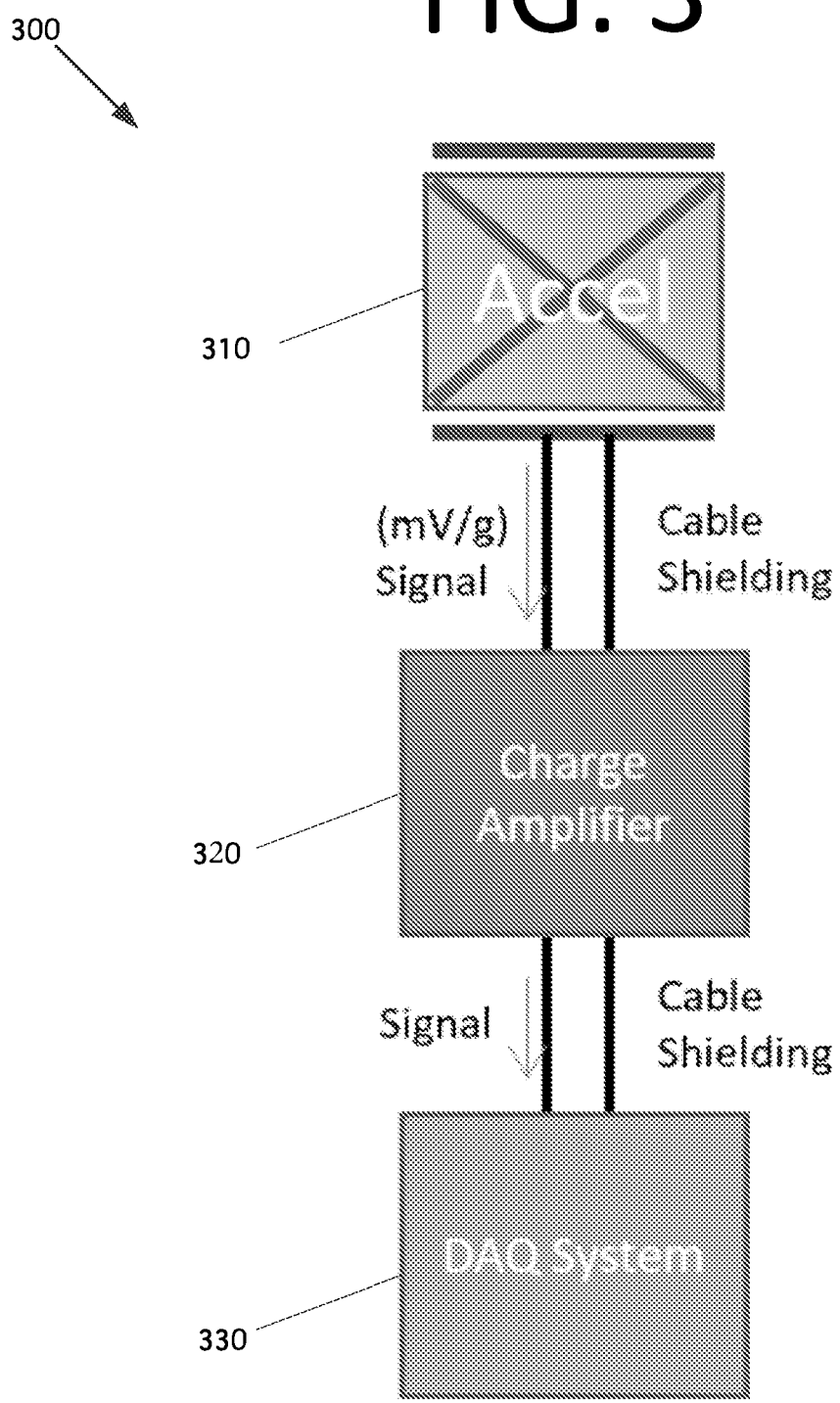
FIG. 3 is an architectural diagram illustrating accelerometer connections for vibration collection, according to an embodiment of the present invention.

FIG. 3 is an architectural diagram illustrating accelerometer connections 300 for vibration collection, according to an embodiment of the present invention. Accelerometer 310 sends a signal in the range of mV/g through a shielded cable to a charge amplifier 320. The amplified signal is then send to a data acquisition circuitry 330, such as that included in an FPGA.

Figure 4:
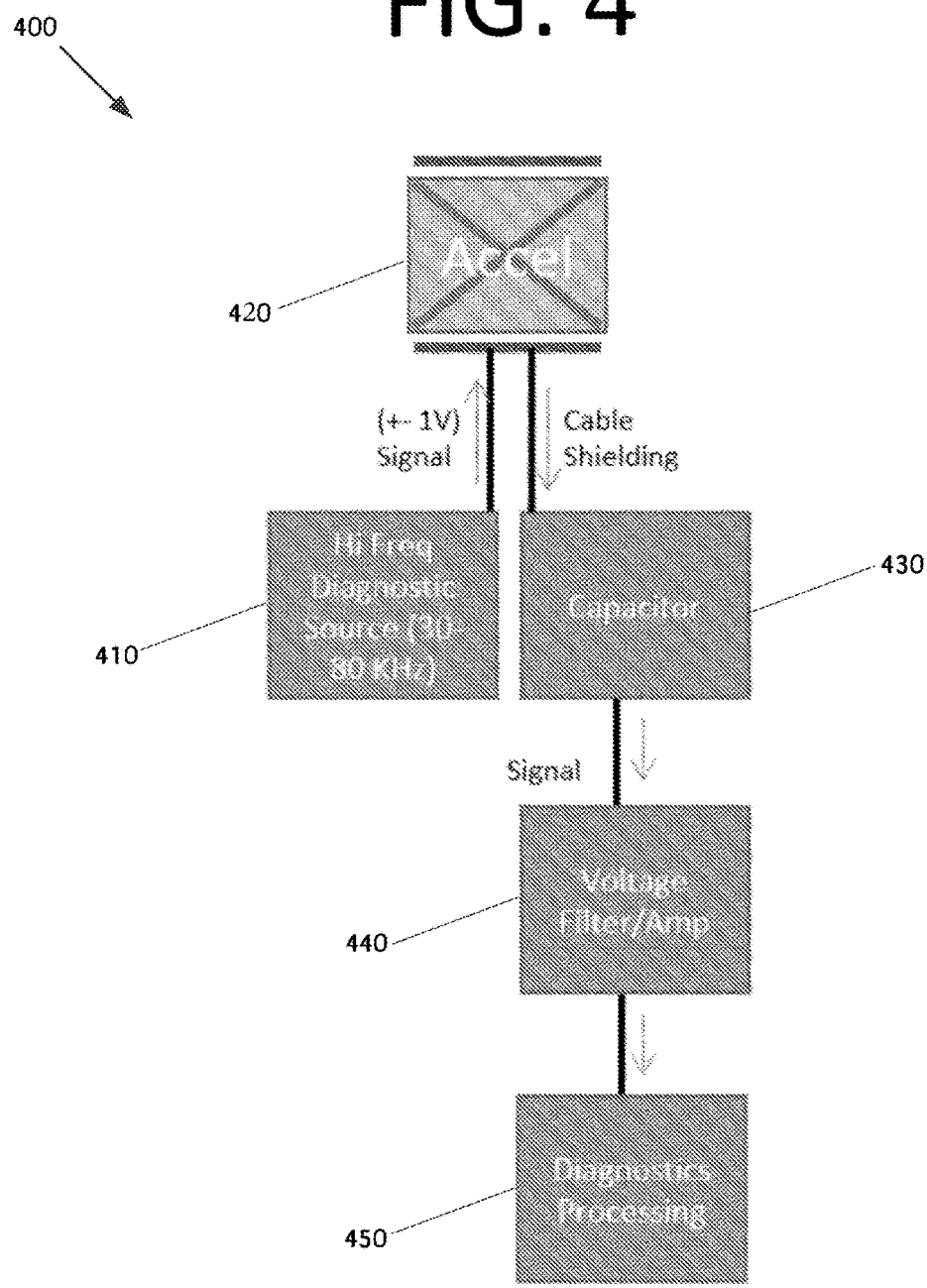
FIG. 4 is an architectural diagram illustrating accelerometer connections for diagnostics collection, according to an embodiment of the present invention.

FIG. 4 is an architectural diagram illustrating accelerometer connections 400 for diagnostics collection, according to an embodiment of the present invention. A high frequency diagnostic source 410 (e.g., a source of an FPGA) at 30-80 kHz and +/−1V is sent through a shielded cable to an accelerometer 420. Responsive to the diagnostic signal, a signal is sent from accelerometer 420 to a capacitor 430, which provides a coupled response. The signal is filtered and amplified by voltage filter and amplifier 440 and then send to diagnostics processing electronics 450 (e.g., of an FPGA) for processing.

Figure 5A:
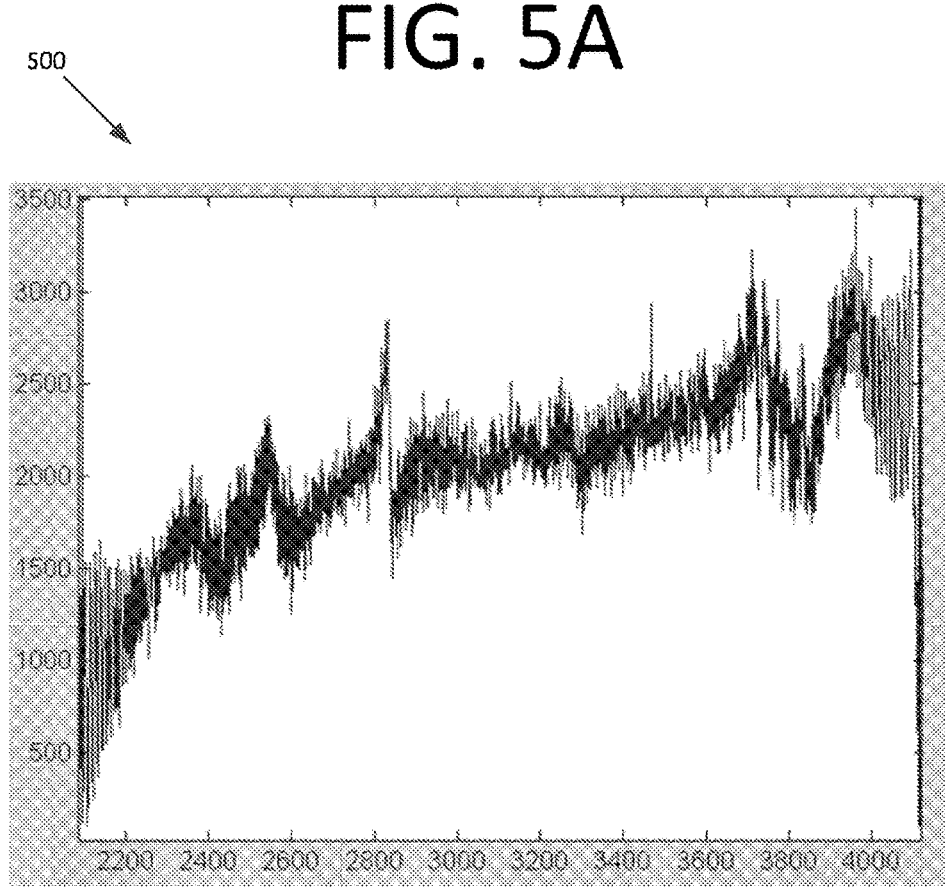
FIG. 5A is a graph illustrating an FPGA result for a tight accelerometer attachment condition, according to an embodiment of the present invention.
Figure 5B:
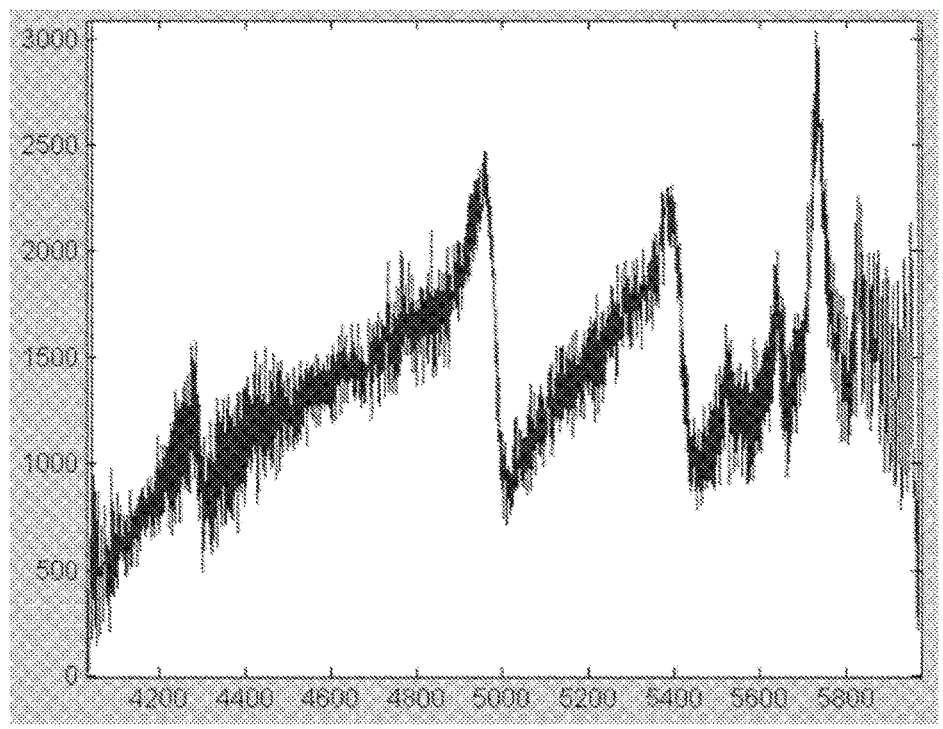
FIG. 5B is a graph illustrating an FPGA result for a tight accelerometer attachment condition, according to an embodiment of the present invention.

Processed results from an SDA system, such as SDA system 200 of FIG. 2, are shown in graphs 500, 510, 600, 610 of FIGS. 5A, 5B, 6A, and 6B, respectively. Graphs 500, 600 show plots for an accelerometer with a tight attachment condition and graphs 510, 610 show plots for an accelerometer with a loose attachment condition. FIGS. 5A and 5B are from the Matlab™ DSP Builder using an 8,000 summer.

Figure 6A:
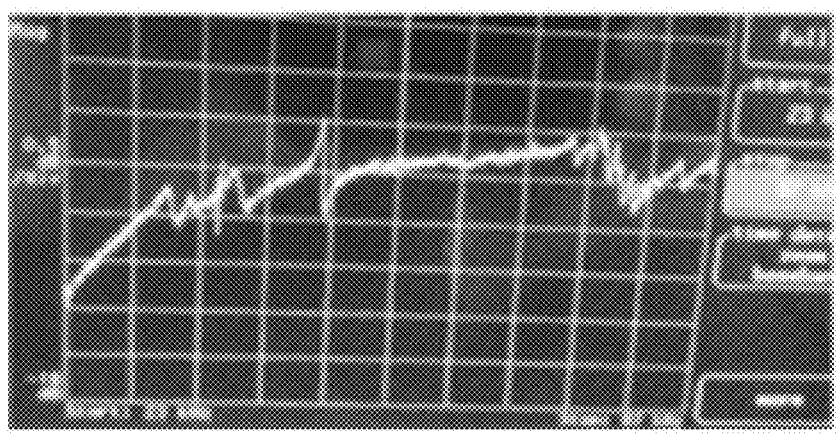
FIG. 6A is a graph illustrating a signal analyzer result for a tight accelerometer attachment condition, according to an embodiment of the present invention.
Figure 6B:
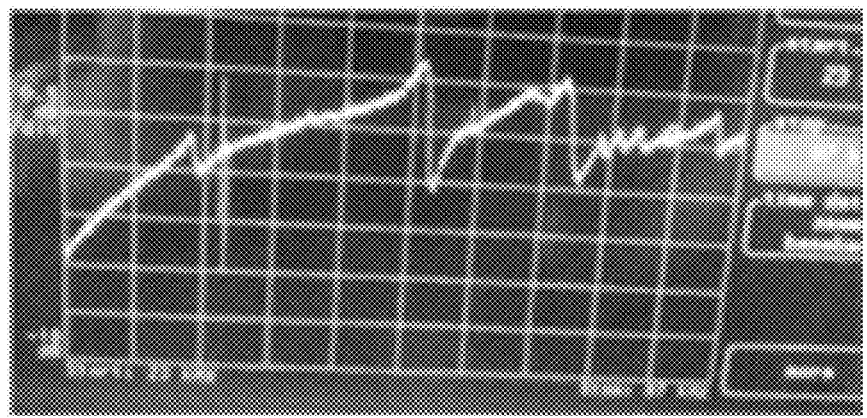
FIG. 6B is a graph illustrating a signal analyzer result for a tight accelerometer attachment condition, according to an embodiment of the present invention.

In FIGS. 5A and 5B, the x-axis is in units that scale to frequency domain (hz) with a scaling factor. The y-axis is in units that scale to voltage with another scaling factor. FIGS. 6A and 6B are from where the source signal is split and grounded through an Agilent™ Signal Analyzer. As can readily be seen, the signal from the loose attachment condition differs significantly from the signal with the tight attachment condition.

As discussed above, in some embodiments, the SDA FPGA system may be integrated into an aircraft or space vehicle to monitor accelerometer health and attachment condition of one or more accelerometers of the aircraft or spacecraft in real time or near-real time. This information may be provided to a crew member (e.g., a pilot) via a display so the crew member may take appropriate action. The display screen may flash, an audible alarm may be provided, or any other suitable warning or combination of warnings may be provided. In some embodiments, the crew member's helmet may display warning information on a heads-up display, vibrate, beep, or provide any suitable warning or combination of warnings. Upon receiving the warning, the crew member may take appropriate action (e.g., using a control panel of the aircraft or spacecraft to remove the faulty or failing accelerometer(s) from voting, disabling the faulty or failing accelerometer(s), instructing other systems to disregard the faulty or failing accelerometer(s), etc.).

Figure 7:
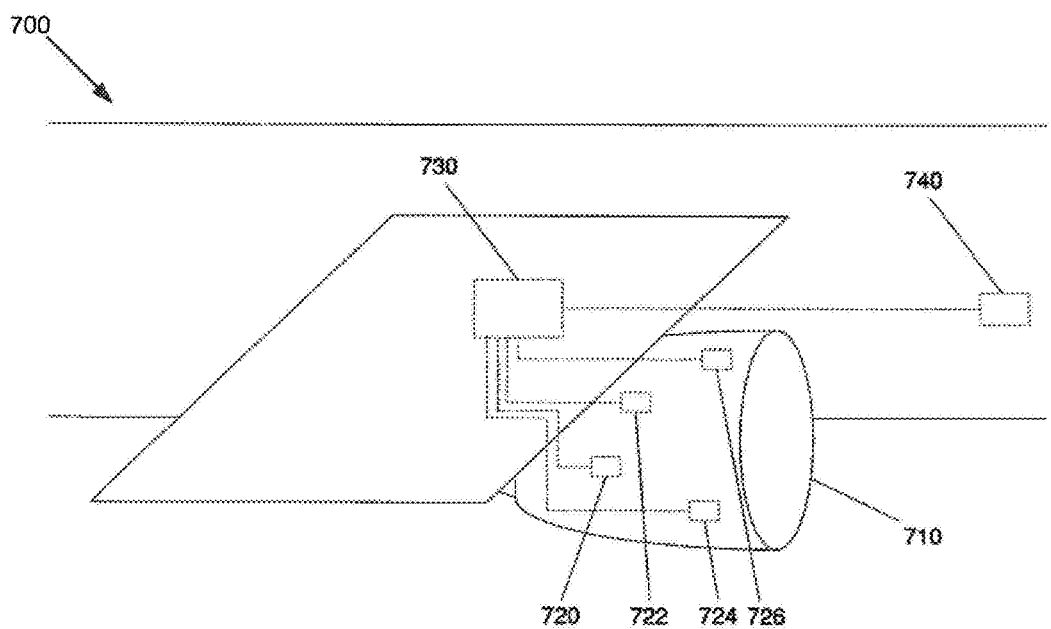
FIG. 7 is an architectural diagram illustrating an SDA FPGA system in an aircraft, according to an embodiment of the present invention.

FIG. 7 is an architectural diagram illustrating an SDA FPGA system in an aircraft 700, according to an embodiment of the present invention. Four accelerometers 720, 722, 724, 726 are located in an engine 710 of aircraft 700. Diagnostic signals are output from, and return signals from accelerometers 720, 722, 724, 726 are input into, SDA FPGA system 730. In some embodiments, rather than having separate inputs for each of accelerometers 720, 722, 724, 726, a switch (not shown) may receive all accelerometer inputs and select therebetween. In such embodiments, SGA FPGA system 730 may periodically instruct the switch to switch accelerometer inputs so it can periodically analyze different accelerometers.

SDA FPGA system 730 may analyze inputs from all accelerometers concurrently in parallel, or may analyze the inputs periodically in serial. In some embodiments, SDA FPGA system 730 contains powerful enough processing to analyze all input signals in real time or near-real time. Once analyzed, information regarding health, attachment condition, or both, for accelerometers 720, 722, 724, 726 is sent to display 740 so a crew member can view the information. In some embodiments, SDA FPGA system 730 may instruct avionics of aircraft 700 to automatically take certain actions based on the accelerometer information. For instance, aircraft 700 may automatically remove failing or faulty accelerometers from polling, instruct onboard systems to disregard accelerometer inputs, provide a critical warning to crew members, or take any other suitable action.

Figure 8:
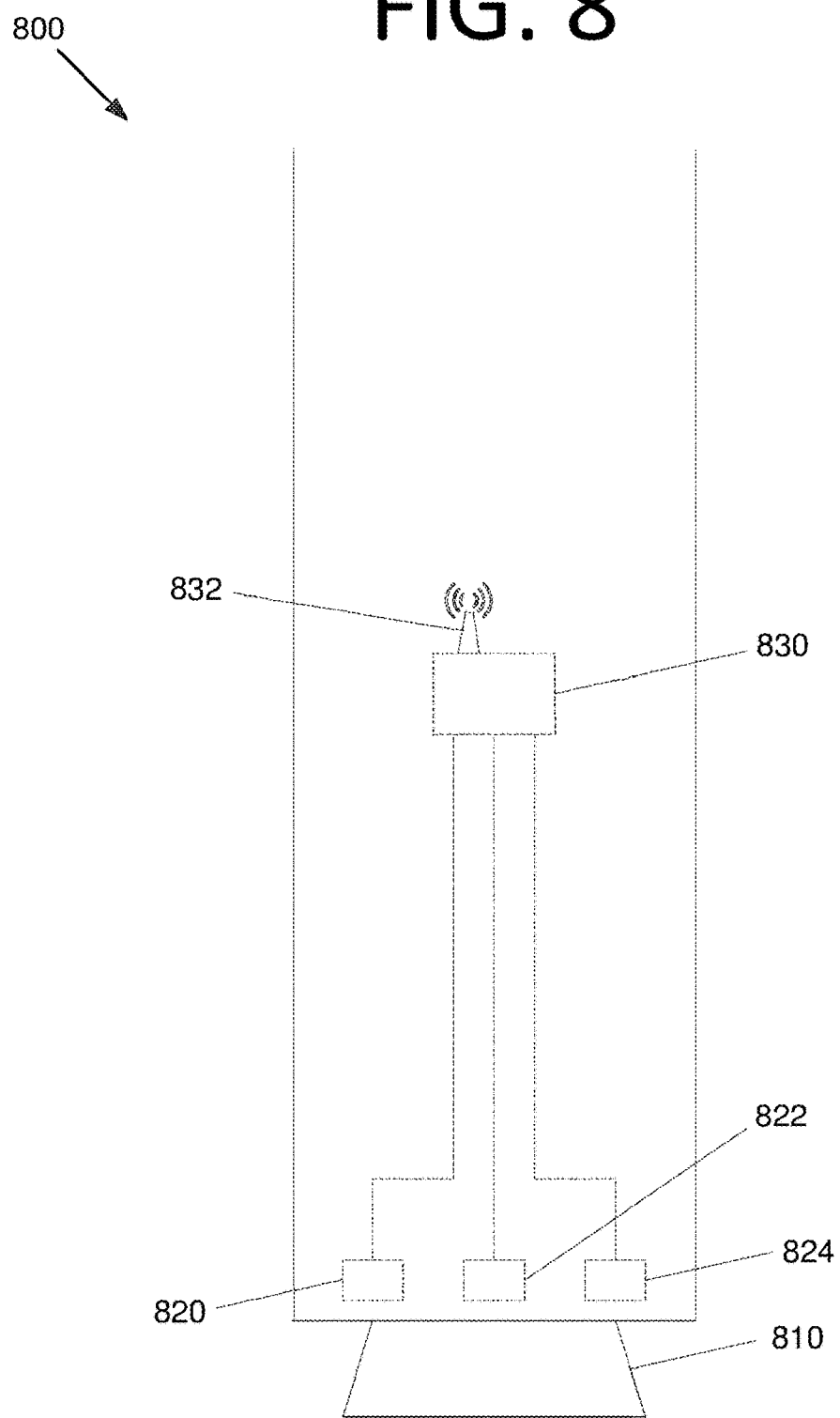
FIG. 8 is an architectural diagram illustrating an SDA FPGA system in a space vehicle, according to an embodiment of the present invention.

FIG. 8 is an architectural diagram illustrating an SDA FPGA system in a space vehicle 800, according to an embodiment of the present invention. Space vehicle 800 includes three accelerometers 820, 822, 824 that are proximate to nozzle 810. Diagnostic signals are output from, and return signals from accelerometers 820, 822, 824 are input into, SDA FPGA system 830. In some embodiments, rather than having separate inputs for each of accelerometers 820, 822, 824, a switch (not shown) may receive all accelerometer inputs and select therebetween. In such embodiments, SGA FPGA system 830 may periodically instruct the switch to switch accelerometer inputs so it can periodically analyze different accelerometers.

SDA FPGA system 830 may analyze inputs from all accelerometers concurrently in parallel, or may analyze the inputs periodically in serial. In some embodiments, SDA FPGA system 830 contains powerful enough processing to analyze all input signals in real time or near-real time. Once analyzed, information regarding health, attachment condition, or both, for accelerometers 820, 822, 824 is sent to mission control or any other desired monitoring entity via wireless transmitter 832. Naturally, if space vehicle 800 is manned, the information may be sent to crew members in addition to or in lieu of wirelessly transmitting the information. In some embodiments, SDA FPGA system 830 may instruct control electronics of space vehicle 800 to automatically take certain actions based on the accelerometer information. For instance, space vehicle 800 may automatically remove failing or faulty accelerometers from polling, instruct onboard systems to disregard accelerometer inputs, provide a critical warning to crew members, or take any other suitable action.

Figure 9:
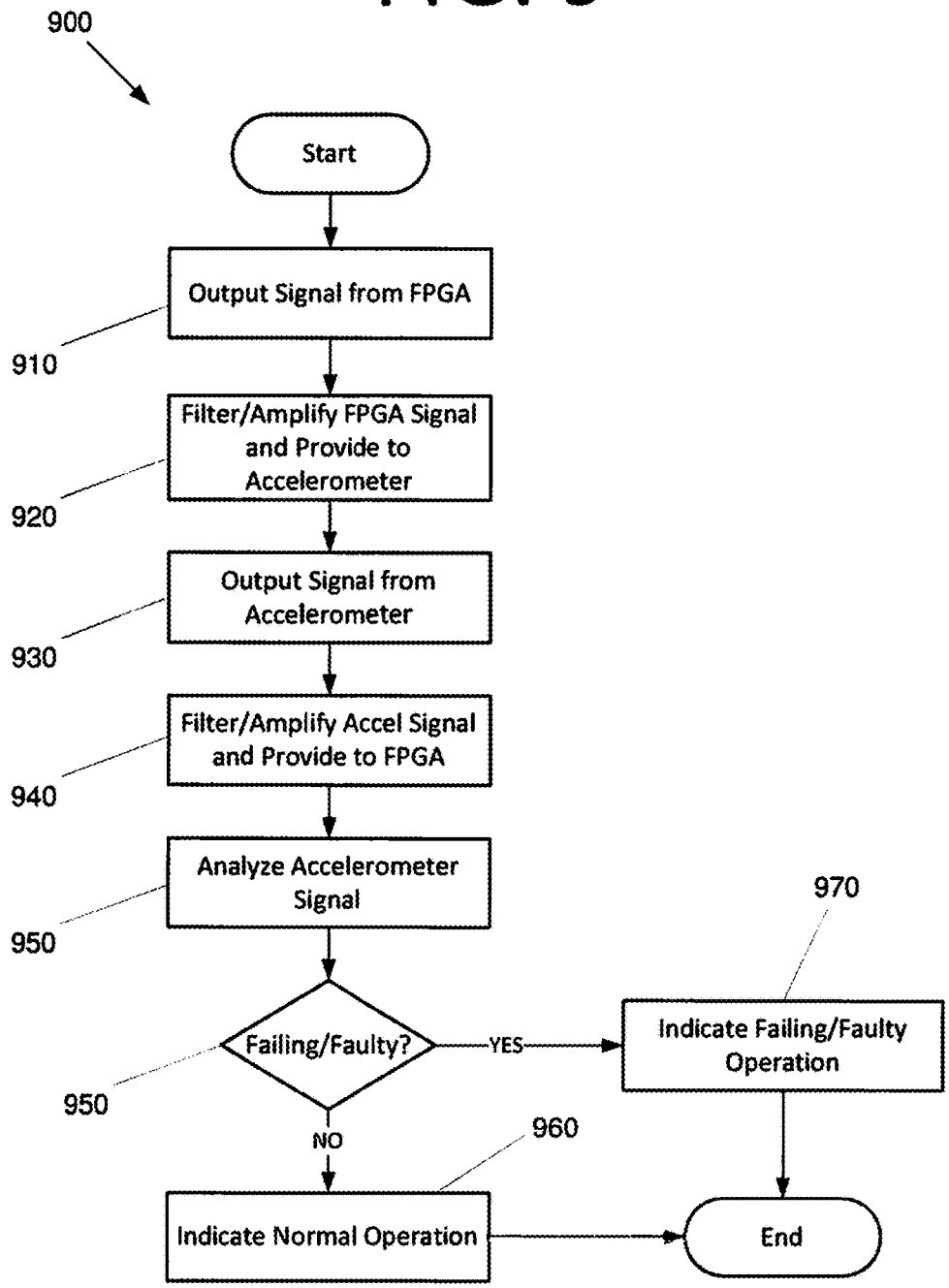
FIG. 9 is a flowchart illustrating a process for determining the health and attachment condition of an accelerometer using an SDA FPGA system, according to an embodiment of the present invention.

FIG. 9 is a flowchart 900 illustrating a process for determining the health and attachment condition of an accelerometer using an SDA FPGA system, according to an embodiment of the present invention. The process begins with outputting a diagnostic signal from an FPGA at 910. The diagnostic signal is filtered, amplified, and provided to an accelerometer at 920.

Responsive to the diagnostic signal, a piezoelectric crystal of the accelerometer, for example, outputs a signal at 930. This signal contains information that can be used to determine the health and attachment condition of the accelerometer via cross correlation. The accelerometer signal is then filtered, amplified, and provided to the FPGA as an input signal at 940.

The FPGA analyzes the input signal by performing cross correlation algorithms at 950. The cross correlation algorithm compares the signal received from the FPGA to a baseline. Deviations are identified and analyzed to determine the type of degradation or failure. If the accelerometer is operating normally at 950, an indication of normal operation is provided at 960 to a crew member, an onboard electronic system, mission control, or any other suitable personnel and/or equipment. If failing or faulty operation is determined at 950, an indication of failing or faulty operation is provided at 970.

Figure 10:
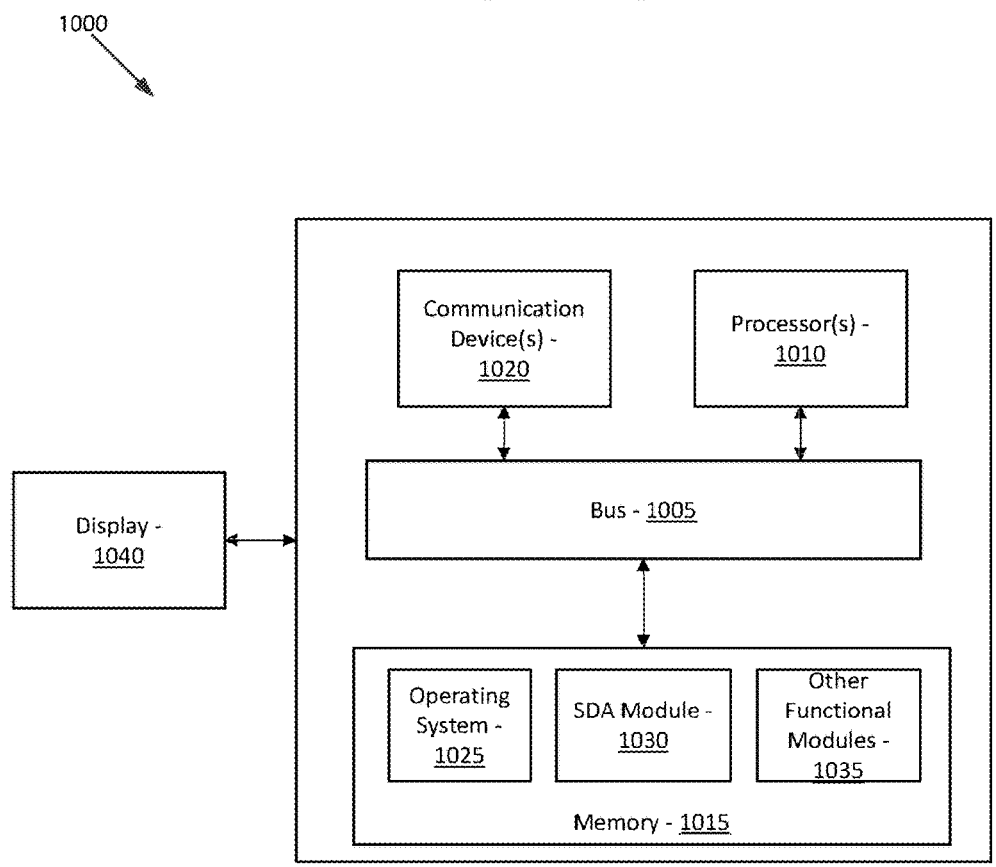
FIG. 10 is a block diagram illustrating a computing system configured to display state of health data for a SDA FPGA system, according to an embodiment of the present invention.

FIG. 10 is a block diagram illustrating a computing system configured to display state of health data for a SDA FPGA system, according to an embodiment of the present invention. System 1000 includes a bus 1005 or other communication mechanism for communicating information, and processor(s) 1010 coupled to bus 1005 for processing information. Processor(s) 1010 may be any type of general or specific purpose processor, including a central processing unit (CPU) or application specific integrated circuit (ASIC). System 1000 further includes a memory 1015 for storing information and instructions to be executed by processor(s) 1010. Memory 1015 can be comprised of any combination of random access memory ("RAM"), read only memory ("ROM"), flash memory, cache, static storage such as a magnetic or optical disk, or any other types of non-transitory computer-readable media or combinations thereof. Additionally, system 1000 includes a communication device 1020, such as a transceiver, to facilitate wired or wireless communication with external systems.

Non-transitory computer-readable media may be any available media that can be accessed by processor(s) 1010 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 1015 stores software modules that provide functionality when executed by processor(s) 1010. The modules include an operating system 1025 for system 1000. The modules further include a SDA module 1030 that is configured to receive diagnostic information from an SDA FPGA system and display accelerometer health and attachment information on display 1040. However, in some embodiments, display 1040 may receive the health ad attachment information from the SDA FPGA system directly. In certain embodiments, SDA module 1030 may perform cross correlation algorithms to determine the accelerometer health and attachment condition. System 1000 may include one or more additional functional modules 1035 that include additional functionality.

One skilled in the art will appreciate that a "system" could be embodied as a computer, a server, an embedded chip, a console, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
an accelerometer attached to a structure;
a field programmable gate array (FPGA) communicably coupled to the accelerometer; and
signal conditioning circuitry operably coupled to the FPGA and the accelerometer, wherein the FPGA is configured to provide a diagnostic signal to the signal conditioning circuitry, wherein:
the signal conditioning circuitry comprises:
a first band pass filter configured to receive, and reduce noise in, the diagnostic signal, and output a filtered diagnostic signal;
a first amplifier configured to receive the filtered diagnostic signal, amplify the filtered diagnostic signal, and output an amplified diagnostic signal to the accelerometer;
a capacitor configured to receive an accelerometer response signal and output a coupled response signal;
a second band pass filter configured to receive, and reduce noise in, the coupled response signal and output a filtered response signal; and
a second amplifier configured to receive the filtered response signal, amplify the filtered response signal, and output a modified accelerometer response signal,
the signal conditioning circuitry is configured to:
provide the diagnostic signal to the accelerometer,
receive the accelerometer response signal responsive to the diagnostic signal from the accelerometer, and
output the modified accelerometer response signal, and
the FPGA is configured to:
receive the modified accelerometer response signal from the signal conditioning circuitry,
process the modified accelerometer response signal using one or more cross correlation algorithms stored thereon, and
output an indication of accelerometer health, an attachment condition, or both.

2. The system of claim 1, wherein the FPGA and signal conditioning circuitry are configured to analyze the accelerometer health, the attachment condition, or both, in real time.

3. The system of claim 1, wherein the structure is an aircraft or a space vehicle.

4. The system of claim 1, further comprising:
a display configured to receive the indication of accelerometer health, the attachment condition, or both, and display the indication.

5. The system of claim 1, wherein the accelerometer is a piezoelectric charge accelerometer.

6. The system of claim 1, wherein the diagnostic signal is a sinusoidal wave signal that sweeps from approximately 30 kHz to approximately 80 kHz.

7. The system of claim 1, wherein the FPGA comprises:
a high frequency diagnostic source configured to generate the diagnostic signal that is sent to the signal conditioning circuitry; and
data acquisition circuitry configured to receive the modified accelerometer response signal from the signal conditioning circuitry.

8. A self-diagnostic accelerometer (SDA) field programmable gate array (FPGA) system, comprising:
a plurality of accelerometers;
a FPGA communicably coupled to the plurality of accelerometers; and
signal conditioning circuitry operably coupled to the FPGA and the plurality of accelerometers, wherein the FPGA is configured to provide one or more diagnostic signals to the signal conditioning circuitry, wherein:
the signal conditioning circuitry comprises:
a first band pass filter configured to receive, and reduce noise in, a received diagnostic signal, and output a filtered diagnostic signal;

a first amplifier configured to receive the filtered diagnostic signal, amplify the filtered diagnostic signal, and output an amplified diagnostic signal to a respective accelerometer;
a capacitor configured to receive an accelerometer response signal and output a coupled response signal;
a second band pass filter configured to receive, and reduce noise in, the coupled response signal and output a filtered response signal; and
a second amplifier configured to receive the filtered response signal, amplify the filtered response signal, and output a modified accelerometer response signal, the SDA circuitry is configured to:
provide the one or more amplified diagnostic signals to the plurality of accelerometers,
receive accelerometer response signals responsive to the diagnostic signal from each of the plurality of accelerometers, and
output modified accelerometer response signals, and
the FPGA is configured to:
receive the modified accelerometer response signals from the signal conditioning circuitry,
process the modified accelerometer response signals using one or more cross correlation algorithms stored thereon, and
output indications of health, an attachment condition, or both, for each of the plurality of accelerometers.

9. The SDA FPGA system of claim 8, wherein the FPGA and signal conditioning circuitry are configured to analyze the health, the attachment conditions, or both, for the plurality of accelerometers in real time.

10. The SDA FPGA system of claim 8, wherein the system is operably connected to or otherwise configured art part of an aircraft or a space vehicle.

11. The SDA FPGA system of claim 8, wherein the plurality of accelerometers each receive a same diagnostic signal.

12. The system of claim 8, wherein the one or more diagnostic signals are sinusoidal wave signals that sweep from approximately 30 kHz to approximately 80 kHz.

13. A field programmable gate array (FPGA), comprising:
a high frequency diagnostic source configured to generate a diagnostic signal that is sent to self-diagnostic accelerometer (SDA) circuitry,
wherein the SDA circuitry comprises:
a first band pass filter configured to receive, and reduce noise in, the diagnostic signal, and output a filtered diagnostic signal;
a first amplifier configured to receive the filtered diagnostic signal, amplify the filtered diagnostic signal, and output an amplified diagnostic signal to a respective accelerometer;
a capacitor configured to receive an accelerometer response signal and output a coupled response signal;
a second band pass filter configured to receive, and reduce noise in, the coupled response signal and output a filtered response signal; and
a second amplifier configured to receive the filtered response signal, amplify the filtered response signal, and output a modified accelerometer response signal;
data acquisition circuitry configured to receive the modified accelerometer response signal from the SDA circuitry responsive to the diagnostic signal;
memory storing one or more cross correlation algorithms that diagnose accelerometer health, an attachment condition, or both; and
at least one processor configured to execute the one or more cross correlation algorithms, wherein the at least one processor is configured to:
process a response signal from the data acquisition circuitry using the one or more cross correlation algorithms, and
output an indication of accelerometer health, an attachment condition, or both.

14. The FPGA of claim 13, wherein the FPGA and SDA circuitry are configured to analyze the accelerometer health, the attachment condition, or both, in real time.

15. The FPGA of claim 13, wherein the diagnostic signal is a sinusoidal wave signal that sweeps from approximately 30 kHz to approximately 80 kHz.

* * * * *